United States Patent
Genussov Ziss et al.

(10) Patent No.: US 11,427,216 B2
(45) Date of Patent: Aug. 30, 2022

(54) USER ACTIVITY-BASED CUSTOMIZATION OF VEHICLE PROMPTS

(71) Applicant: GM GLOBAL TECHNOLOGY OPERATIONS LLC, Detroit, MI (US)

(72) Inventors: Michal Genussov Ziss, Tel-Aviv (IL); Kobi Nistel, Kadima-Zoran (IL); Gila Kamhi, Zichron Yaakov (IL); Eli Tzirkel-Hancock, Ra'anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 461 days.

(21) Appl. No.: 16/433,867

(22) Filed: Jun. 6, 2019

(65) Prior Publication Data

US 2020/0385011 A1 Dec. 10, 2020

(51) Int. Cl.
*B60W 50/08* (2020.01)
*G10L 13/00* (2006.01)
*G06V 20/59* (2022.01)
*B60W 50/00* (2006.01)

(52) U.S. Cl.
CPC ......... *B60W 50/085* (2013.01); *G06V 20/597* (2022.01); *G10L 13/00* (2013.01); *B60W 2050/0082* (2013.01)

(58) Field of Classification Search
CPC ........ B60W 50/085; B60W 2050/0082; G06K 9/00845; G10L 13/00; B60K 28/02
USPC .......................................................... 701/36
See application file for complete search history.

(56) References Cited

U.S. PATENT DOCUMENTS

| 6,957,128 B1* | 10/2005 | Ito ........................ G08G 1/0962 701/1 |
| 9,251,704 B2 | 2/2016 | Tzirkel-Hancock et al. |
| 10,095,228 B1* | 10/2018 | Kuffner, Jr. .......... G05D 1/0088 |
| 2014/0277932 A1* | 9/2014 | Prakah-Asante ....... G06F 17/00 701/36 |
| 2016/0001781 A1* | 1/2016 | Fung ..................... G16H 50/20 701/36 |
| 2016/0109701 A1* | 4/2016 | Goldman-Shenhar ...................... G02B 27/01 345/8 |
| 2016/0253895 A1* | 9/2016 | Prakah-Asante ...... G16H 40/67 340/539.12 |
| 2017/0291543 A1* | 10/2017 | Goldman-Shenhar ... B60Q 9/00 |
| 2018/0204572 A1* | 7/2018 | Manabe .................. G10L 13/00 |
| 2018/0260642 A1* | 9/2018 | Kim ..................... G06V 20/597 |
| 2019/0171409 A1* | 6/2019 | Boulanger ............. H04H 60/35 |
| 2020/0259948 A1* | 8/2020 | Keohane ............... H04L 67/306 |

(Continued)

FOREIGN PATENT DOCUMENTS

DE 202017105445 U1 * 1/2018 ......... G06F 16/9038

*Primary Examiner* — Krishnan Ramesh
(74) *Attorney, Agent, or Firm* — Cantor Colburn LLP (57) ABSTRACT

A system for interacting with a user in a vehicle includes a processing device including an input module configured to receive measurement data from one or more sensors, the measurement data related to features of the user. The system also includes a prompt design module configured to, in response to receiving an instruction to output a requested prompt to the user, determine a user state based on the measurement data, determine an activity state based on the measurement data and the user state, customize the requested prompt based on the user state and the activity state to generate a customized prompt, and output the customized prompt to the user.

20 Claims, 3 Drawing Sheets

(56) References Cited

U.S. PATENT DOCUMENTS

2020/0269848 A1* 8/2020 Kang .................... G06N 20/00

* cited by examiner

USER ACTIVITY-BASED CUSTOMIZATION OF VEHICLE PROMPTS

INTRODUCTION

The subject disclosure relates to user activity-based management of vehicle prompts.

Vehicles (e.g., automobiles, trucks, construction equipment, farm equipment, automated factory equipment) are increasingly equipped with interactive devices, including on-board computer systems that allow drivers and passengers to interact with such systems. A user can interact with such a system to, for example, issue instructions and receive information. Interactive devices include display devices, haptic feedback devices, and speakers. For example, prompts may be provided via the display or speakers in a variety of situations. The prompts may provide information about the vehicle, points of interest in the vicinity, entertainment suggestions, and the like.

SUMMARY

In one exemplary embodiment, a system for interacting with a user in a vehicle includes a processing device including an input module configured to receive measurement data from one or more sensors, the measurement data related to features of the user. The system also includes a prompt design module configured to, in response to receiving an instruction to output a requested prompt to the user, determine a user state based on the measurement data, determine an activity state based on the measurement data and the user state, customize the requested prompt based on the user state and the activity state to generate a customized prompt, and output the customized prompt to the user.

In addition to one or more of the features described herein, the customized prompt is a speech prompt generated by a speech generation module.

In addition to one or more of the features described herein, the requested prompt is a base prompt having a base format, and customizing the requested prompt includes changing the base format to a customized format associated with the user state and the activity state.

In addition to one or more of the features described herein, determining the user state includes selecting the user state from a plurality of stored user states, each stored user state related to one or more features estimated based on the measurement data.

In addition to one or more of the features described herein, each stored user state is related to one or more stored activity states, and each stored activity state is related to a stored customized prompt.

In addition to one or more of the features described herein, determining the activity state includes selecting a stored activity state from the one or more stored activity states related to the user state, and generating the customized prompt includes selecting a stored customized prompt related to the selected stored activity state.

In addition to one or more of the features described herein, the user is one of a plurality of users, and the plurality of stored user states, the one or more stored activity states and the stored customized prompt are stored in a data structure specific to the user.

In addition to one or more of the features described herein, the data structure is a look-up table.

In addition to one or more of the features described herein, the stored customized prompt is based on a preference of the user.

In addition to one or more of the features described herein, the prompt design module is configured to further customize the requested prompt based on an urgency associated with the requested prompt and/or contextual information related to at least one of an interior of the vehicle and a condition external to the vehicle.

In one exemplary embodiment, a method of interacting with a user in a vehicle includes receiving measurement data from one or more sensors, the measurement data related to features of the user. The method also includes, in response to receiving an instruction to output a requested prompt to the user, determining a user state based on the measurement data, determining an activity state based on the measurement data and the user state, customizing the requested prompt based on the user state and the activity state to generate a customized prompt, and outputting the customized prompt to the user.

In addition to one or more of the features described herein, the customized prompt is a speech prompt generated by a speech generation module.

In addition to one or more of the features described herein, the requested prompt is a base prompt having a base format, and customizing the requested prompt includes changing the base format to a customized format associated with the user state and the activity state.

In addition to one or more of the features described herein, determining the user state includes selecting the user state from a plurality of stored user states, each stored user state related to one or more features estimated based on the measurement data.

In addition to one or more of the features described herein, each stored user state is related to one or more stored activity states, and each stored activity state is related to a stored customized prompt.

In addition to one or more of the features described herein, determining the activity state includes selecting a stored activity state from the one or more stored activity states related to the user state, and generating the customized prompt includes selecting a stored customized prompt related to the selected stored activity state.

In addition to one or more of the features described herein, the user is one of a plurality of users, and the plurality of stored user states, the one or more stored activity states and the stored customized prompt are stored in a data structure specific to the user.

In addition to one or more of the features described herein, the data structure is a look-up table.

In addition to one or more of the features described herein, the stored customized prompt is based on a preference of the user.

In addition to one or more of the features described herein, the method further includes customizing the requested prompt based on an urgency associated with the requested prompt and/or contextual information related to at least one of an interior of the vehicle and a condition external to the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
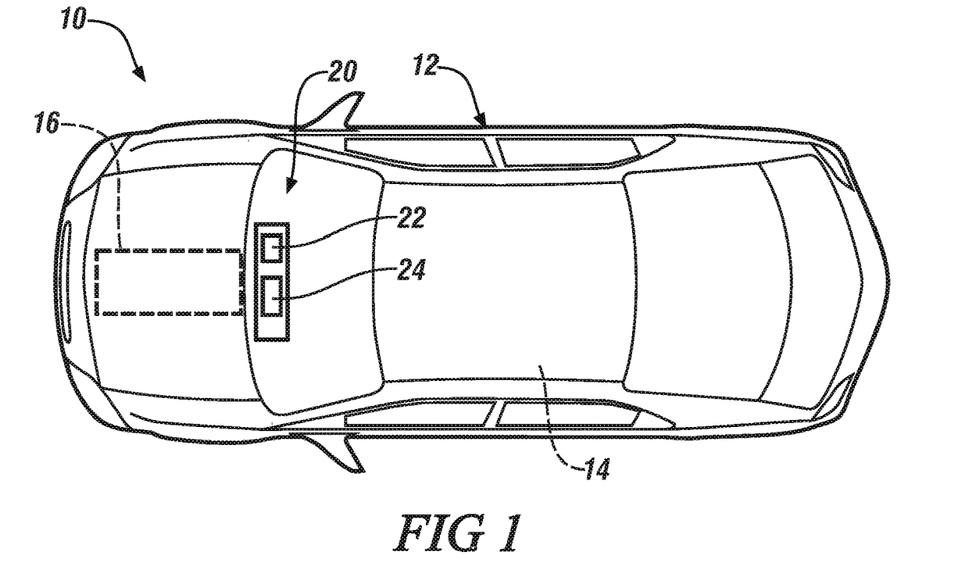
FIG. 1 is a top view of a motor vehicle including a user interface, vehicle processing device and system for interacting with a user.

FIG. 1 shows an embodiment of a motor vehicle 10, which includes a vehicle body 12 defining, at least in part, an occupant compartment 14. The vehicle body 12 also supports various vehicle subsystems including an engine assembly 16, and other subsystems to support functions of the engine assembly 16 and other vehicle components, such as a braking subsystem, a steering subsystem, a fuel injection subsystem, an exhaust subsystem and others.

The vehicle 10 also includes an interaction system 20 that includes one or more processing devices 22 and a user interface 24. The interaction system 20 is configured to detect user inputs, such as inputs via a screen and/or buttons, and speech inputs. The interaction system 20 is also configured to output information and notifications to the user, which may be visual (e.g., displayed on a screen), tactile (e.g., a vibration), and/or audible. For example, the interaction system 20 includes functionality for outputting audible information via a speaker. Outputs to the user may be in the form of prompts, which are outputs to a user that provide various types of information. A "prompt" is a communication to a user (e.g., a driver or passenger) that provides some kind of information, such as a notification regarding a condition of the vehicle 10, information regarding a point of interest or an external condition (e.g., an accident or traffic) and/or a notification regarding an opportunity to instruct the vehicle 10 or a vehicle subsystem to perform a function. The user prompt is described in embodiments as an audible speech prompt. However, the prompt may take any suitable form, such as a text, graphical or tactile form.

The interaction system 20 is configured to generate customized prompts based on the determination of a user state and a user activity. A "user state" refers to a state of being of a user, which is a condition of a user at some particular time. Examples of a user state include user availability, emotional states (for example, calm, angry or frustrated) and cognitive states (for example, confused, distracted or concentrating). An "activity state" refers to a condition in which a user is performing some activity. Examples of activities include talking, driving, searching, using a mobile phone or other device and others.

In one embodiment, the interaction system 20 determines a user state based on data collected by one or more sensors, such as a microphone and/or a camera. The interaction system 20 may also determine an activity state based on the collected data. Data collected by sensors is described herein as "measurement data."

In one embodiment, the interaction system 20 is configured to output a customized prompt by modifying or customizing an initial prompt requested or instructed by a processing device in the vehicle 10 and/or in the interaction system 20. The initial prompt is referred to herein as a "requested prompt" or a "base prompt," and is customized by the interaction system 20 based on a determined user state and activity state. In addition, the interaction system 20 can customize a base prompt based on other factors, such as urgency, a prompt category and contextual information. Contextual information may include an internal context, such as a condition within the vehicle 10 (for example, the presence of passengers, behavior of passengers in the vehicle and others), and/or an external context (for example, conditions outside of the vehicle such as behavior of other vehicles, weather, vehicle location and others).

In one embodiment, the interaction system 20 includes or is connected to a database, file system or other data structure that stores a plurality of base prompts that can be requested for output to a user via, for example, a vehicle speech system. In addition, the data structure stores a plurality of stored user states and stored activity states related to each stored base prompt. For example, for a given base prompt, a storage location (e.g., system memory, a server, a mobile device memory, etc.) stores a plurality of user states, and for each stored user state, stores one or more activity states as sub-states. The user states and activity states can be stored in a relational database, table or other suitable data structure. In one embodiment, user states and activity states for a given base prompt are stored in a look-up table assigned to a user.

Figure 2:
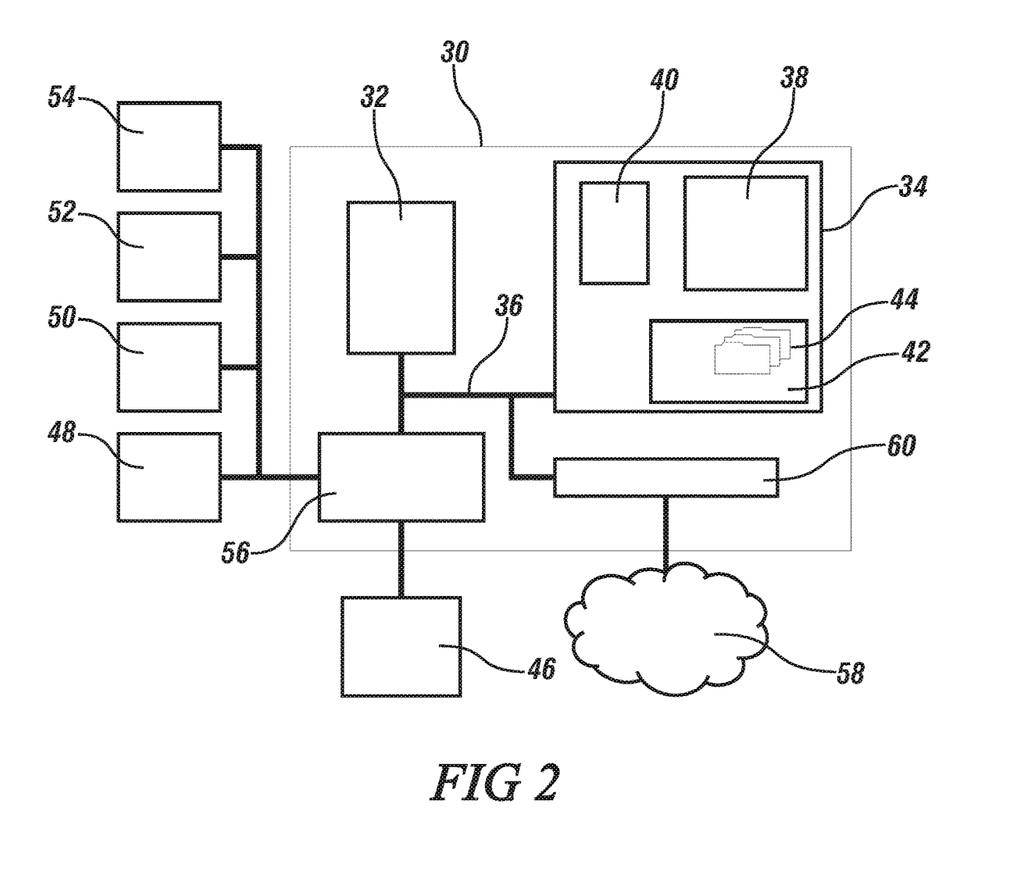
FIG. 2 depicts aspects of a user interaction system, in accordance with an aspect of an exemplary embodiment.

FIG. 2 illustrates aspects of an embodiment of a computer system 30 that is in communication with or is part of the interaction system 20, and that can perform various aspects of embodiments described herein. The computer system 30 includes at least one processing device 32, which generally includes one or more processors for performing aspects of prompt generation and interaction methods described herein. The processing device 32 can be integrated into the vehicle 10, for example, as an onboard processor such as the one or more processing devices 22, or can be a processing device separate from the vehicle 10, such as a server, a personal computer or a mobile device (e.g., a smartphone or tablet). For example, the processing device 32 can be part of, or in communication with, one or more engine control units (ECU), one or more vehicle control modules, a cloud computing device, a vehicle satellite communication system and/or others. The processing device 32 may be configured to perform prompt generation and interaction methods described herein, and may also perform functions related to control of various vehicle subsystems.

Components of the computer system 30 include the processing device 32 (such as one or more processors or processing units), a system memory 34, and a bus 36 that couples various system components including the system memory 34 to the processing device 32. The system memory 34 may include a variety of computer system readable media. Such media can be any available media that is accessible by the processing device 32, and includes both volatile and non-volatile media, removable and non-removable media.

For example, the system memory 34 includes a storage system 38 for reading from and writing to a non-removable, non-volatile memory (e.g., a hard drive). The system memory 34 may also include volatile memory 40, such as random access memory (RAM) and/or cache memory. The computer system 30 can further include other removable/non-removable, volatile/non-volatile computer system storage media.

The system memory 34 can include at least one program product having a set (e.g., at least one) of program modules that are configured to carry out functions of the embodiments described herein. For example, the system memory 34 stores a program/utility 42, having a set (at least one) of program modules 44. The program/utility 42 may be an operating system, one or more application programs, other program modules, and program data. The program modules 44 generally carry out the functions and/or methodologies of embodiments described herein. For example, the program modules 44 can include modules for performing various functions, such as acquiring data (e.g., an input module), generating and outputting user prompts (e.g., a prompt design module), and/or controlling aspects of vehicle operation. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 can also communicate with one or more external devices 46 such as a keyboard, a pointing device, and/or any devices (e.g., network card, modem, etc.) that enable the processing device 32 to communicate with one or more other computing devices. In addition, the processing device 32 can communicate with one or more devices for detecting user inputs and/or outputting prompts to a user. For example, the computer system 30 includes or is connected to a display device 48 such as a screen or touchscreen (e.g., onboard or on a mobile device), a speaker 50, a camera 52 and/or a microphone 54. Communication with various devices can occur via Input/Output (I/O) interfaces 56. One or more of the above components may form all or part of the interface 24 of FIG. 1.

The processing device 32 may also communicate with one or more networks 58 such as a local area network (LAN), a general wide area network (WAN), and/or a public network (e.g., the Internet) via a network adapter 60. It should be understood that although not shown, other hardware and/or software components could be used in conjunction with the computing system 30. Examples include, but are not limited to: microcode, device drivers, redundant processing units, external disk drive arrays, RAID systems, and data archival storage systems, etc.

Figure 3:
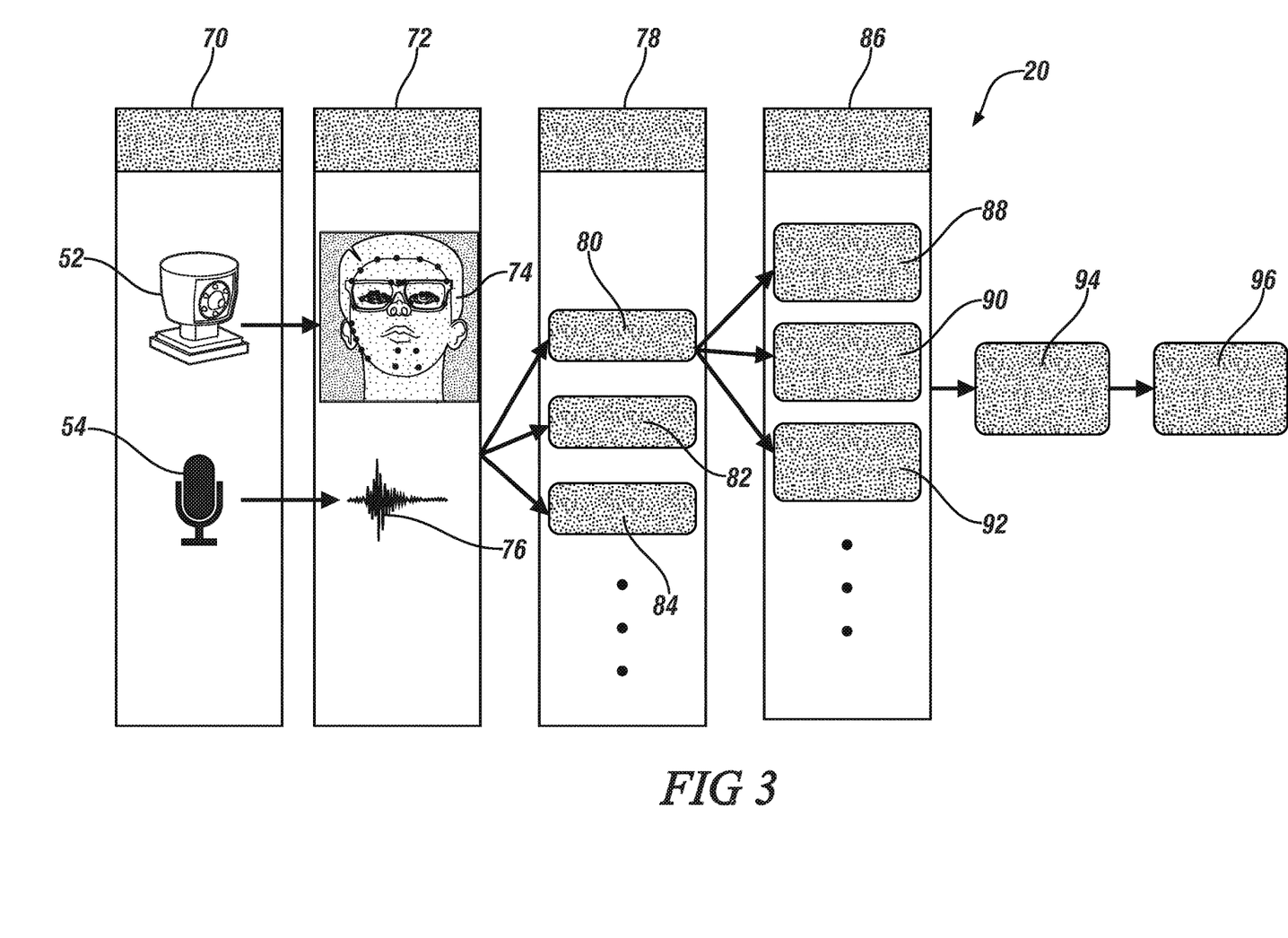
FIG. 3 depicts an architecture of a user interaction system, in accordance with an aspect of an exemplary embodiment.

FIG. 3 depicts aspects of the interaction system 20 and/or the computer system 30, and a system architecture related to customizing and outputting user prompts. The architecture includes a sensor level 70 that utilizes one or more sensors that collect data and information related to a user state. Examples of sensors include the camera 52 and the microphone 54. A features level 72 includes functionality for extracting or detecting one or more user features that can be used to determine a user state and/or an activity state. User features may include various facial features 74 (for example, facial expressions, eye movement, facial movement, facial coloring and others) and vocal or speech features 76 (for example, the content of speech, speed of speech, tone, inflections and others).

The architecture also includes a user state level 78 including functionality for determining a user state based on one or more features. A "user state" refers to a state of being of a user, which is a condition of a user at some particular time. The user state can refer to an emotional state, an availability, etc. Examples of a user state are shown in FIG. 3, which include a "busy" state 80, a "confused" state 82 and an "available" state 84. It is noted that the user states described herein are not limited to the examples shown.

The architecture further includes an activity state level 86 that includes functionality for determining a user activity state. A "user activity state" refers to a specific activity or type of activities that a user is engaged in. Examples of activity states are shown in FIG. 3, and include a "talking to a passenger" state 88, a "driving" state 90 and a "talking to the vehicle system" state 92. Based on the user state and activity state, the interaction system 20 employs an adaptive prompt design module 94 that generates a customized prompt 96 that is output to the user.

Figure 4:
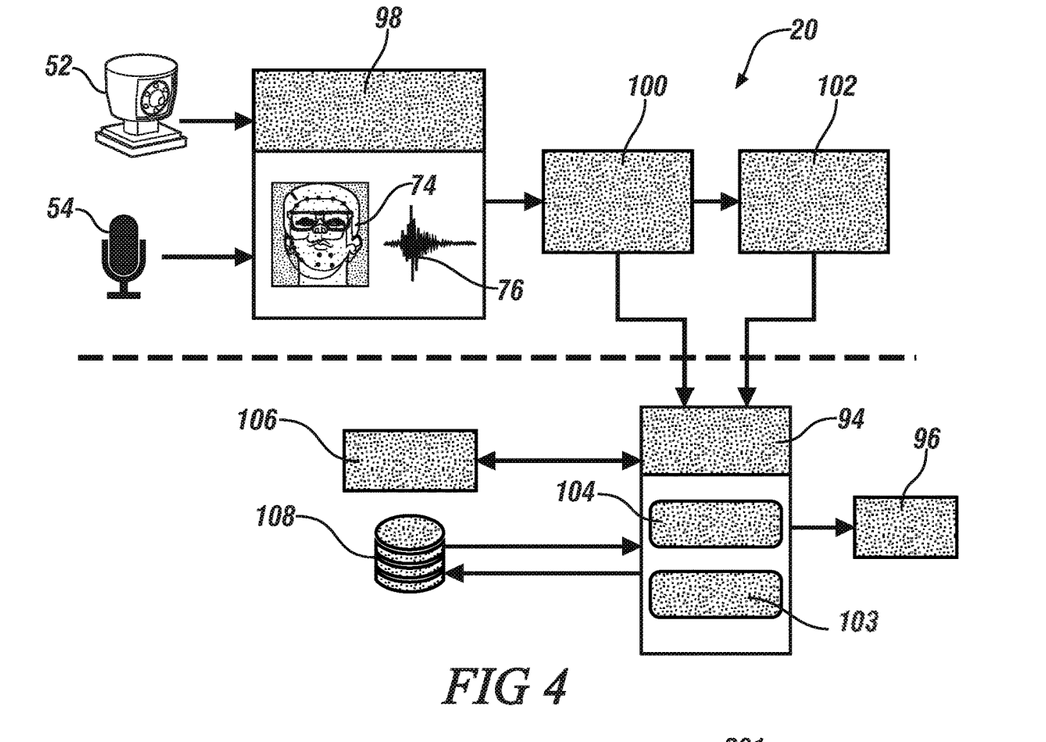
FIG. 4 depicts aspects of a user interaction system that includes one or more machine learning or artificial intelligence classifiers, in accordance with an aspect of an exemplary embodiment.

Referring to FIG. 4, the interaction system 20 is configured to perform one or more methods of interacting with a user. Generally, the methods include determining a user state, determining a user activity state related to the user state, and selecting or generating a prompt based on the user state and activity state. Selecting and generating the prompt may be based on other factors, such as the external and/or external context at the time of the prompt, a category of the prompt and/or user preferences.

Determining the user state and the activity state is based on features of the user (e.g. the facial features 74 and/or the speech features 76) and/or conditions around the user. Measurement data collected from sensors such as the microphone 54 and the camera 52 is analyzed to extract or determine features, for example, by an analysis module 98. Examples of features include eye movement, facial features, speech content and speech characteristics. Although not shown, any other relevant features can be detected or estimated, such as biometric characteristics (e.g., temperature and heart rate).

The following examples illustrate how the interaction system 20 determines user states. In these examples, the user states are "busy", "available", and "confused," although the system can be configured to determine any user state (e.g., angry, relaxed, under stress, etc.).

The user state "busy" can be determined based on video and/or images taken by the camera 52 and/or sounds detected by the microphone 54 to identify features, such as: the user is speaking, the user is concentrating, the user is driving, and/or the user is performing some activity identifiable by the camera 52 (e.g., eating, drinking). For example, the analysis module 98 detects mouth movement from camera images and/or recording of the user's voice and determines that a user feature is "talking." Other recorded features, such as another person's voice, can also be detected. In another example, the analysis module 98 can detect features related to eye movement, which can be used by the system to determine if the user is concentrating, looking around, looking at a passenger, etc.

In addition, contextual information including external factors and/or internal factors can be identified to determine whether the user is busy by identifying conditions that may require the user's attention, such as an accident and driving behavior of other drivers. Any combination of various external sensors can be used to determine external factors, such as cameras, radar, microphones, and devices for communicating with other vehicles and/or other locations (e.g., weather and/or traffic monitoring systems). Internal factors can be estimating using the camera and/or microphone to identify internal conditions that may require user attention, such as crying, loud noises, vehicle notifications.

Any combination of the above features and external factors can be used to determine whether the user is busy. For example, the user is determined to be in a busy state if the user is speaking or concentrating, and/or if there is an identified external condition that may require the user's attention.

The user state "available" can be determined based on video and/or images taken by the camera 52 and/or microphone recordings to identify features, such as that the user is not speaking or doing anything but driving (e.g., using images from the camera showing that the user is not talking and/or determining that the user is not talking using the microphone). Sensors can also be used to determine whether there is an internal or external condition that may require user attention.

The user state "confused" can be determined based on facial features and/or user speech characteristics. For example, the interaction system 20 can include a speech recognition system to determine hesitation during a dialog, or using a timeout message from the speech recognition system to determine there was a timeout in a dialog. Other features can include facial expressions to determine whether the user is confused, e.g., using visual sentiment analysis on camera images to determine if the user is confused. Speech recognition can include detection of a word sequence that indicates confusion.

Each user state may be related to one or more activity states. An activity state can be associated with one user state or multiple user states. In one embodiment, each activity state is treated as a sub-state (dependent on a user state) to allow the system to customize a user prompt.

For example, the user state "busy" can be associated with any number of activity states, which relate to a user's activity. Examples of activity states associated with the "busy" state include "talking to another passenger," "talking to a vehicle speech system," "driving" and "concentrating." The interaction system 20 can determine that the user is concentrating based on eye movement. For example, if eye movement is low, it can be inferred that the user is concentrating.

The activity state of "talking to another passenger" can be determined using the microphone 54 to identify multiple speakers and/or identify speech patterns. For example, the activity state of "talking to another passenger" can be identified if it is determined that different speakers are alternating. The camera 52 can be used to determine whether there are other persons in the vehicle 10, and an eye gaze tracker system can be used to determine that the user is often looking towards another passenger. The user is in this activity state if the system 20 uses the above factors and determines that the user is talking to another person.

The activity state "talking to the speech system" can be determined based on detecting that the user is providing input to a speech system in the vehicle 10. For example, this activity state can be determined using feedback from the speech recognition system to determine that a speech recognition session is currently taking place.

The activity state of "concentrating" or "driving" can be determined based on various sensor inputs. For example, eye gaze tracking may be used to determine that the user is currently concentrating, as there is a strong correlation between eye movement and concentration. Other factors that can be used to determine if a user is concentrating include the occurrence of a situation that requires user's attention. Such a situation can be identified based on measurement data from external sensors (e.g., radars, cameras).

In one embodiment, user states and activity states are determined using artificial intelligence and/or machine learning to classify features using one or more classifiers. Each classifier can receive measurement data from sensors in the vehicle 10 and determine by a classification algorithm whether the measurement data belongs to a class. For example, the system 20 includes a classifier to determine whether measurement data belongs to a class associated with specific user states (e.g., the user states of "busy," "available" and "confused"). Likewise, the system 20 includes a classifier to determine whether a user is in an activity state such as "talking," "driving" and "inactive".

Generally, a classifier is a processing module or algorithm configured to analyze measurement data and determine whether the measurement data falls into a class. The classifier may be configured to determine whether data falls into a single class, falls into one of two classes, or falls into one of three or more classes. A class can be established by training the classifier using selected features as training data. The training data may be, for example, data selected from the most relevant sensor measurements. In one embodiment, each classifier includes a neural network or a support vector machine (SVM).

Referring again to FIG. 4, in one embodiment, the interaction system 20 includes a user state classifier 100 and an activity state classifier 102. As shown in FIG. 4, features detected or estimated by the analysis module 98 are output to the user state classifier 100, which determines a user state by classifying features as part of one or more user state classes. The determined user state and the one or more features are then output to the activity state classifier 102.

For example, features are detected by analyzing measurement data from the camera 52 and the microphone 54. Based on data from the microphone, the analysis module 98 determines that a user is not talking, and based on analysis of images of the user's face, the analysis module 98 determines an orientation of the user's eyes and an amount of eye movement. Such features are output to the user state classifier 100. The user state classifier 100 determines that the user is in the user state denoted as "busy" based on determining that the user's eye movement is below a threshold amount of eye movement, and the user's eyes are consistently pointed forward.

The user state classifier 100 outputs the features and the determined user state to the activity state classifier 102. The activity state classifier 102 then determines an activity state based on the features and the user state. For example, the user state "busy" is received and the activity state classifier 102 classifies the features into pre-configured activity state classes. It is noted that the activity state classes are related to a specific user state; the activity state classes for one user state may be different than the activity state classes for another user state. In this example, the activity state classes associated with "busy" include "talking to another person," "talking on a mobile device," "talking to the speech system" and "driving." According to the user's preferences, driving can be considered available or busy.

The determined user state and activity state are then output to the prompt design module 94. The prompt design module 94 includes suitable logic for selecting or otherwise outputting a customized prompt 96 to the user. In addition, the prompt design module 94 includes domain logic 103 for designing or customizing a prompt based on a category or domain associated with the prompt. Examples of categories include vehicle data (e.g., fuel level, performance data and others), points of interest, entertainment, safety (e.g., a notification of an unsafe or potentially unsafe condition), whether the prompt is proactive or in-dialog and others. The customized prompt 96 may be output as speech to the user by a natural language generator 104 or other suitable processing module.

In one embodiment, the customized prompt 96 is selected from a plurality of stored prompts. For example, a prompt database 106 or other suitable storage location stores pre-configured prompts, which are customized based on the user state, the activity state, and other information such as user preference data and/or prompt meta-data. The user preference data may be stored with or in the prompt database or stored in a separate user preference database 108.

It is noted that, depending on the system configuration, a feature associated with one state can instead be associated with another state. For example, user preferences can be input so that a user can select whether the system considers that the activity state of "driving" is related to the user state of "busy" or "available."

In one embodiment, the system 20 is configured to store a plurality of pre-configured, customized prompts based on user states and activity states. For example, the prompt database stores a data structure for each of a plurality of base prompts. For each base prompt, a data structure stores a plurality of user states. Each stored user state is related to or associated with one or more stored activity states. For example, base prompts, user identifiers, features and customized prompts can be stored in a relational database.

In one embodiment, the customized prompts are stored in a look-up table LUT assigned to each user. Each LUT stores information for a given user, including a base prompt, a plurality of user states, one or more activity states dependent on or otherwise related to each user state, and a customized prompt associated with each combination of user state and activity state.

Figure 5:
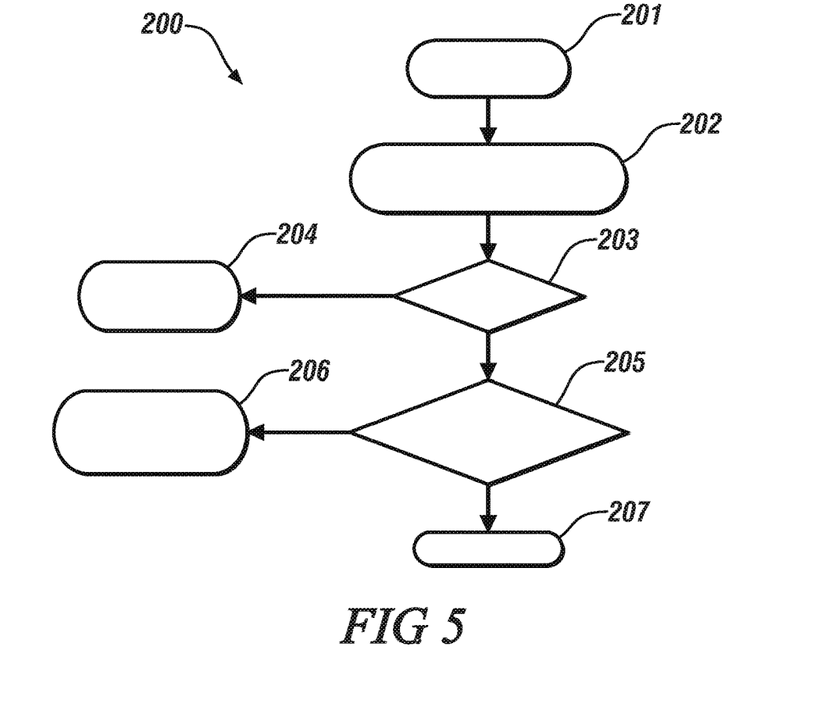
FIG. 5 is a flowchart depicting aspects of a method of interacting with a user and/or generating and outputting a customized prompt to a user, in accordance with an aspect of an exemplary embodiment.

FIG. 5 illustrates embodiments of a computer-implemented method 200 of interacting with a user in a vehicle. The user may be a driver or a passenger. The method 200 may be performed by a processor or processors disposed in a vehicle (e.g., as an ECU or on-board computer) and/or disposed in a device such as a smartphone, tablet or smartwatch. The method 200 is discussed in conjunction with the interaction system of FIG. 1 and components shown in FIG. 2 for illustration purposes. It is noted that aspects of the method 200 may be performed by any suitable processing device or system.

The method 200 includes a plurality of stages or steps represented by blocks 201-207, all of which can be performed sequentially. However, in some embodiments, one or more of the stages can be performed in a different order than that shown or fewer than the stages shown may be performed.

At block 201, a processing device such as the processing device 32 in the vehicle 10 receives a request or instruction to output a prompt to a user. The requested prompt is referred to as a base prompt and is in an initial format (e.g., a long or full format). The prompt request may be initiated via user interaction, by conditions inside of the vehicle 10 and/or by conditions outside of the vehicle 10. For example, the request may be in response to a question by the user. In other examples, a prompt is requested in response to a condition in the vehicle 10, such as an indication of fuel level, oil level, tire pressure, and/or an indication that the vehicle 10 or a subsystem should be checked. In still other examples, the request may be based on external conditions, such as a location of the vehicle or the location of other vehicles. For example, a prompt may be requested to inform the user of a location of interest, such as a restaurant or gas station. In response to the request or instruction, the processing device generates or selects a base prompt "Z".

At block 202, the processing device determines a user state based on measurement data such as video, images and sounds. Based on the user state, the processing device determines an activity state. In one embodiment, the activity state is selected from one or more stored activity states dependent on or otherwise related to the determined user state.

The processing device then selects or otherwise generates a customized prompt "$Z_1$" based on the user state and the activity state. For example, the processing device accesses a database, look-up table or other data structure, and selects a stored prompt that is related to the determined user state and activity state.

In one embodiment, the base prompt Z can be further customized based on factors in addition to the user state and the activity state. Examples of additional factors are discussed below, however the method 200 is not so limited.

At block 203, in one embodiment, the processing device determines a level of urgency associated with the base prompt Z. The level of urgency may be provided by the requesting device. For example, the base prompt Z includes meta-data that stores information such as the urgency level (e.g., low, medium or high).

At block 204, if the meta-data indicates that the urgency is above a selected level (e.g., medium or high), the base prompt is immediately output as a customized prompt $Z_2$ in a format dictated by the system. The format may be selected as the same format as the base prompt (a full format), or may be selected based on a user preference.

In one embodiment, the level of urgency can be determined based on measurement data. For example, if the vehicle's fuel level is extremely low, the processing device overrides the prompt customization and outputs the base prompt based on a high urgency level. In another example, if an unsafe condition or a condition exists that requires immediate attention (e.g., nearby vehicles driving unsafely or coming too close), the processing device determines that the urgency is high.

At block 205, the processing device determines whether the prompt should be further customized based on contextual information. The context may be determined based on external context, such as the vehicle location, surrounding environment (e.g., urban vs. rural), and the remaining amount of time. Based on the context, at block 206, the base prompt Z may be further customized to generate and output a customized prompt "$Z_3$."

At block 207, if the urgency level is not above a selected level, and contextual information does not require further customization, the processing device outputs the customized prompt $Z_1$.

An example of the method 200 is discussed below based on examples of LUTs that can be stored, for example, in the prompt database 106. In this example, a base prompt is associated with a LUT for each user registered in the interaction system 20. The interaction system 20 customizes the base prompt based on a determined user state and a determined activity state. The base prompt can also be customized based on, for example, a level of urgency, a category, whether the prompt is proactive or in response to user dialog, user preferences and contextual information.

The base prompt is stored in an initial or base format. Examples of the format include full or long, short, delayed or canceled. For illustration purposes, an example of a base prompt is "Your fuel level is running low. Here is a list of the closest gas stations". The base prompt can be customized to be in one of the above formats. For example, a short format for the prompt can be "Your fuel level is running low." A delayed format is a format in which the prompt is delayed for a pre-selected amount of time or until the user is no longer in the determined activity state. A canceled format indicates that the prompt is not output at all.

The base prompt or requested prompt may be associate with metadata. For example, the metadata can indicate a level of urgency, and a category (e.g., vehicle data, safety, points of interest, entertainment, whether the prompt is proactive or in-dialog).

The interaction system 20, in response to receiving a request to output the base prompt, accesses a LUT for the user. Examples of such LUTs are shown below. It is noted that the formats for the customized prompts shown in the LUTs may be pre-configured or configured by the system 20, or one or more of the customized prompts are configured based on user preferences. For example, the user can select specific formats for different user states and/or activity states.

The following table ("Table 1") is a first LUT for a first user ("User1"), which prescribes formats used for customization of a base prompt:

TABLE 1

| | |
|---|---|
| User State1 - busy | UserActivity1A - Talking to another passenger<br>Prompt format: "Your fuel level is running low" (short)<br>User Activity1B - Talking to the speech system<br>Prompt format: (delay) |
| User State2 - available | User Activity2A - available<br>Prompt format: "Your fuel level is running low. Here is a list of the closest gas stations" (long)<br>User Activity2B - Driving - available<br>Prompt format: "Your fuel level is running low" (short) |
| User State3 - Confused | User Activity3A - Confused due to a dialog with the speech recognition system<br>Prompt format: (delay)<br>User Activity3B - Confused due to another reason<br>Prompt format: "Your fuel level is running low" (short) |

The following table ("Table 2") is a second LUT for a second user ("User2"), which prescribes formats used for customization of a base prompt. In this example, in contrast to the above example, User2 has selected as a user preference that the activity state of "driving" is dependent on the user state of "busy:

TABLE 2

| | |
|---|---|
| User State1 - busy | UserActivity1A - Talking to another passenger<br>Prompt format: "Your fuel level is running low. Here is a list of the closest gas stations" (long)<br>User Activity1B - Talking to the speech system<br>Prompt format: "Your fuel level is running low" (short)<br>User Activity1C - Driving - concentration needed<br>Prompt: "Your fuel level is running low" (short) |
| User State2 - available | User Activity2A - available<br>Prompt: "Your fuel level is running low. Here is a list of the closest gas stations" (long) |
| User State3 - Confused | User Activity3A - Confused due to a dialog with the speech recognition system<br>Prompt: "Your fuel level is running low" (short)<br>User Activity3B - Confused due to another reason<br>Prompt: "Your fuel level is running low. Here is a list of the closest gas stations" (long) |

Embodiments described herein have numerous advantages. For example, the system customizes prompts based on user activity. The embodiments increase driver safety and avoid unnecessarily distracting a driver, as contrasted with typical user interaction systems that issue a given prompt regardless of what a user is doing at the time that the prompt is issued. The issuance of prompts by such typical systems can be distracting or at least unhelpful. In addition, embodiments described herein provide customized prompts in formats appropriate for different situations, which improves user interaction with a vehicle and provides a better user experience than other systems.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for interacting with a user in a vehicle, comprising:
 a processing device including an input module having a first processor configured to receive measurement data from one or more sensors, the measurement data related to features of the user;
 a prompt design module having a second processor configured to, in response to receiving an instruction to output a requested prompt to the user, perform:
  determining a user state based on the measurement data;
  determining an activity state based on the measurement data and the user state;
  determining a level of urgency associated with the requested prompt;
  identifying a base prompt based on the requested prompt, the base prompt stored in a data structure, the data structure including a plurality of stored base prompts, each stored base prompt related in the data structure to one or more stored user states and one or more stored activity states, each stored base prompt related to a plurality of stored customized prompts configured to present a message to the user, the plurality of stored customized prompts including at least one full format prompt having a full version of the message and at least one short format prompt having a short version of the message;
  customizing the identified base prompt based on the user state and the activity state to generate a customized prompt, wherein customizing includes selecting a stored user state related to the identified base prompt based on the determined user state, selecting a stored activity state related to the selected stored user state, and selecting a stored customized prompt related to the selected stored activity state, wherein the selected stored customized prompt is a full format prompt based on the level of urgency being lower than a reference level, and the selected stored customized prompt is a short format prompt based on the level of urgency being equal to or higher than the reference level; and
  outputting the selected stored customized prompt to the user.

2. The system of claim 1, wherein the customized prompt is a speech prompt generated by a speech generation module.

3. The system of claim 1, wherein each stored activity state is a sub-state of a related user state in the data structure.

4. The system of claim 3, wherein the user state is selected from a plurality of stored user states, and each stored user state of the plurality of stored user states is related to one or more features estimated based on the measurement data.

5. The system of claim 4, wherein each stored user state is related to a plurality of stored activity states, and each stored activity state of the plurality of stored activity states is related to a stored customized prompt.

6. The system of claim 5, wherein the stored activity state is selected from a plurality of stored activity states related to the user state.

7. The system of claim 5, wherein the user is one of a plurality of users, and the plurality of stored user states, the one or more stored activity states and the stored customized prompt are stored in a data structure specific to the user.

8. The system of claim 7, wherein the data structure is a look-up table.

9. The system of claim 7, wherein the stored customized prompt based on a preference of the user.

10. The system of claim 1, wherein the prompt design module is configured to further customize the requested prompt based on
contextual information related to at least one of an interior of the vehicle and a condition external to the vehicle.

11. A method of interacting with a user in a vehicle, comprising:
receiving measurement data from one or more sensors, the measurement data related to features of the user;
in response to receiving an instruction to output a requested prompt to the user, performing:
determining a user state based on the measurement data;
determining an activity state based on the measurement data and the user state;
determining a level of urgency associated with the requested prompt;
identifying a base prompt having an initial format based on the requested prompt, the base prompt stored in a data structure, the data structure including a plurality of stored base prompts, each stored base prompt related in the data structure to one or more stored user states and one or more stored activity states each stored base prompt related to a plurality of stored customized prompts configured to present a message to the user, the plurality of stored customized prompts including at least one full format prompt having a full version of the message and at least one short format prompt having a short version of the message;
customizing the identified base prompt based on the user state and the activity state to generate a customized prompt, wherein customizing includes selecting a stored user state related to the identified base prompt based on the determined user state, selecting a stored activity state related to the selected stored user state, and selecting a stored customized prompt related to the selected stored activity state, wherein the selected stored customized prompt is a full format prompt based on the level of urgency being lower than a reference level, and the selected stored customized prompt is a short format prompt based on the level of urgency being equal to or higher than the reference level; and
outputting the selected stored customized prompt to the user.

12. The method of claim 11, wherein the customized prompt is a speech prompt generated by a speech generation module.

13. The method of claim 11, wherein each stored activity state is a sub-state of a related user state in the data structure.

14. The method of claim 13, wherein the user state is selected from a plurality of stored user states, and each stored user state of the plurality of stored user states is related to one or more features estimated based on the measurement data.

15. The method of claim 14, wherein each stored user state is related to a plurality of stored activity states, and each stored activity state of the plurality of stored activity states is related to a stored customized prompt.

16. The method of claim 15, wherein the stored activity state is selected from a plurality of stored activity states related to the user state.

17. The method of claim 15, wherein the user is one of a plurality of users, and the plurality of stored user states, the one or more stored activity states and the stored customized prompt are stored in a data structure specific to the user.

18. The method of claim 17, wherein the data structure is a look-up table.

19. The method of claim 17, wherein the stored customized prompt is based on a preference of the user.

20. The method of claim 11, further comprising customizing the requested prompt based on
contextual information related to at least one of an interior of the vehicle and a condition external to the vehicle.

* * * * *